Jan. 10, 1956     P. P. GOTTSCHALL     2,730,006
STRIP WIDTH GAGE

Filed March 19, 1952     2 Sheets-Sheet 1

Inventor:
PAUL P. GOTTSCHALL,
by: Donald G. Dalton
his Attorney.

Jan. 10, 1956 P. P. GOTTSCHALL 2,730,006
STRIP WIDTH GAGE
Filed March 19, 1952 2 Sheets-Sheet 2

Inventor:
PAUL P. GOTTSCHALL,
by: Donald G. Dalton
his Attorney.

United States Patent Office 2,730,006
Patented Jan. 10, 1956

2,730,006

STRIP WIDTH GAGE

Paul P. Gottschall, Concord, Calif., assignor to United States Steel Corporation, a corporation of New Jersey Application March 19, 1952, Serial No. 277,365

6 Claims. (Cl. 88—14)

This invention relates to a strip width gage and more particularly to a gage for determining the width of a steel strip traveling through a processing line such as a continuous pickler. Most of such gages now in use require an element for contacting the edges of the strip thus causing damage thereto. Those gages which do not require that the edges of the strip be contacted include a number of movable parts or complicated electrical circuits.

It is an object of my invention to provide a strip width gage of simple construction which does not require the use of moving parts or complicated circuits.

Figure 1:
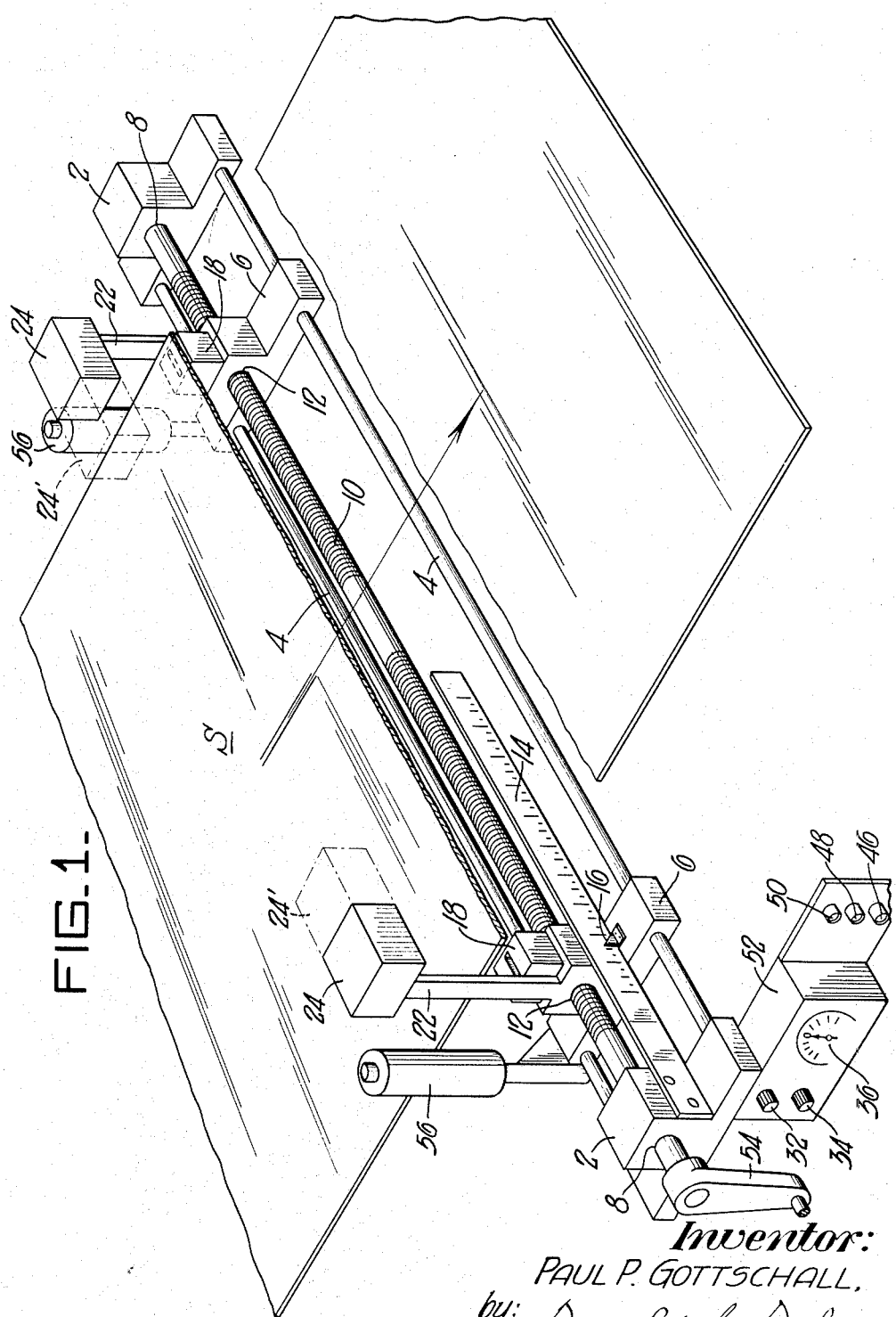
Figure 2:
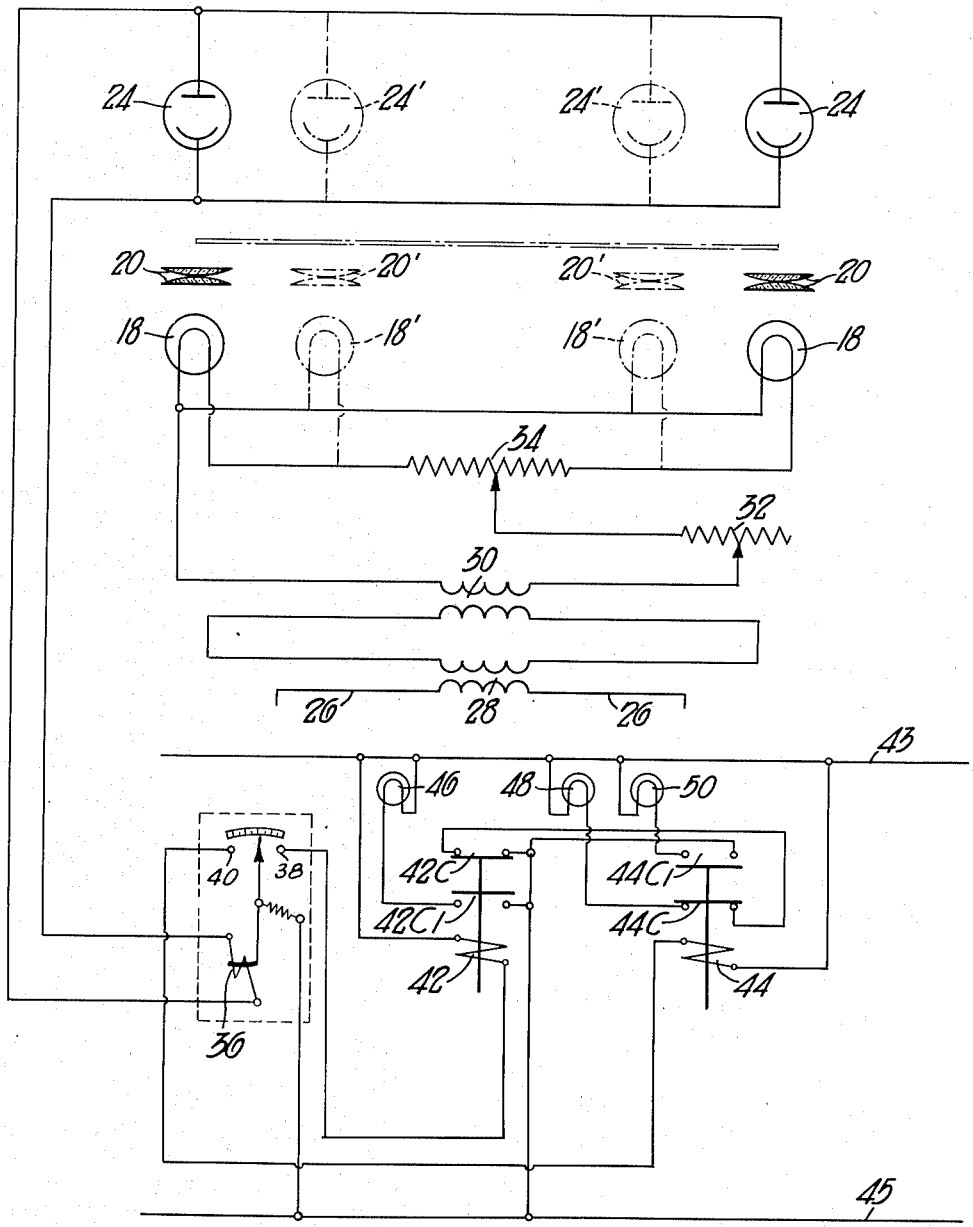

This and other objects will be more apparent after referring to the following specification and attached drawings, in which:

Figure 1 is a perspective view of the gage with a strip passing therethrough; and Figure 2 is a schematic wiring diagram of the electrical circuits of the gage.

Referring more particularly to the drawings, the reference numeral 2 indicates a stationary supporting structure located at each edge of a moving strip S. A pair of rods 4 extend between the members 2 and support a pair of carriages 6. The members 2 are provided with aligned openings 8 for receiving a double threaded screw 10 which engages a threaded opening 12 in each of the carriages 6. Mounted on one of the members 2 is a stationary scale 14 which cooperates with a pointer 16 on one of the carriages 6 to indicate approximately the width of the strip S. A light source 18 is mounted on each carriage 6 below the path of travel of strip S. A pair of cylindrical lenses 20 are mounted on each of the carriages 6 between the light source 18 and the strip S. The convex surfaces of the lenses 20 are adjacent each other as best shown in Figure 2. An arm 22 extends upwardly on each carriage 6 and supports a photo-voltaic cell 24 above the path of travel of strip S adjacent its edge.

Power for the light sources 18 is provided from a 110 volts 60 cycle A. C. supply source 26 through a voltage regulating transformer 28 and a light source transformer 30. Light sources 18 are connected in parallel to the transformer 30. An adjusting rheostat 32 is arranged in series with said light sources. A balancing rheostat 34 is connected across the light sources 18. The photo-voltaic cells 24 are connected in parallel to a micro-ammeter 36. The micro-ammeter 36 is standard de-energized left so that its pointer will be to the extreme left position when no current is flowing. However, the scale is calibrated in inches both ways from zero center. The microammeter 36 is provided with two normally open contacts 38 and 40 which are connected in parallel to the power lines 43 and 45. A relay coil 42 is connected in series with the contact 38 and a relay coil 44 is connected in series with the contact 40. Three lights 46, 48 and 50 are connected in parallel across the lines 43 and 45. The relay coil 42 is provided with a normally closed contact 42C and a normally open contact 42C1.

The relay coil 44 is provided with a normally closed contact 44C and a normally open contact 44C1. The normally open contact 42C1 is connected in series with the light 46, normally closed contacts 42C and 44C are connected in series with the light 48, and the normally open contact 44C1 is connected in series with the light 50. A panel board 52 is mounted on one of the members 2. The adjusting rheostat 32, balancing rheostat 34, the micro-ammeter 36 and the lights 46, 48 and 50 are mounted on the panel board 52. A handle 54 is mounted on one end of the shaft 10. A pair of guide rolls 56 are mounted one adjacent each edge of the strip S.

The operation of my device is as follows: With power applied to the transformer 28 a constant voltage will be supplied to the light source transformer 30 thus causing current to flow through the rheostat 32, rheostat 34 and the light sources 18. With no strip in the device the rheostat 32 is set so that the micro-ammeter 36 reads full scale. One light source 18 is then covered and the balancing rheostat 34 adjusted so that the ammeter 36 reads zero in the center of the scale. The other light source 18 is then covered and the first light source uncovered and the micro-ammeter 36 should again read zero center. The handle 54 is then turned until the pointer 16 is opposite the desired width on the scale 14. If the strip S is of the width indicated on scale 14 the amount of light appearing on photo-voltaic cells 24 will have an area equal to the area of one cell. This will give a zero reading on the scale of ammeter 36 and the contacts 38 and 40 will remain open and light 48 will be on. In case the strip passing through the gage is over width it blocks more light and less active material on cells 24 is subjected to light. The ammeter 36 therefore reads less than half scale and inasmuch as the scale is calibrated in inches from the center the exact excess width is indicated. With this amount of current passing through ammeter 36 the contact 40 will close thus energizing relay coil 44, causing contact 44C to open and contact 44C1 to close. Thus the light 48 will go out and the light 50 will come on. If the strip is less than the standard width a greater amount of light will fall on photo-voltaic cells 24 thus resulting in an ammeter deflection of more than half scale. This amount of current flowing through the ammeter 36 will close contacts 38 thus energizing relay coil 42, causing its contact 42C to open and its contact 42C1 to close. This will cause light 48 or 50 to go out and light 46 to come on.

The guide rollers 56 will keep the strip S centered with respect to the carriages 6. However, the rollers 56 are not absolutely necessary and may be omitted. If desired an additional light source 18' and an additional photo-voltaic cell 24' may be provided on each carriage 6 so as to provide for greater variations in width of the strip being gaged. The light sources 18' will be connected in parallel with the light sources 18 and the photo-voltaic cells 24' will be connected in parallel to the photo-voltaic cells 24. Ageing of the photo-voltaic cells 24 and loss of light output from light source 18 can be compensated for by periodical checking of the equipment and by adjusting the rheostats 32 and 34.

While one embodiment of my invention has been shown and described it will be apparent that other adaptations and modifications may be made without departing from the scope of the following claims.

I claim:

1. A gage for determining the distance between the opposite edges of a moving elongated article comprising a pair of carriages one adjacent each edge of said article, means mounting said carriages for movement transversely of said article, a light source mounted on each of said carriages on one side of said article, a photo-sensitive device mounted on each carriage on the side of said article opposite said light source, a source of power, said light sources being connected in parallel to said source of power, an adjusting rheostat in series with said light sources, a balancing rheostat connected across said light sources, and an ammeter calibrated to indicate variations in the width of the article, said photo-sensitive devices being connected in parallel to said ammeter.

2. A gage for determining the distance between the opposite edges of a moving elongated article comprising a pair of carriages one adjacent each edge of said article, means mounting said carriages for movement transversely of said article, a stationary scale, a pointer on one of said carriages in cooperative arrangement with said scale, a light source mounted on each of said carriages on one side of said article, a photo-sensitive device mounted on each carriage on the side of said article opposite said light source, a source of power, said light sources being connected in parallel to said source of power, an adjusting rheostat in series with said light sources, a balancing rheostat connected across said light sources, and an ammeter calibrated to indicate variations in the width of the article, said photo-sensitive devices being connected in parallel to said ammeter.

3. A gage for determining the distance between the opposite edges of a moving elongated article comprising a pair of carriages one adjacent each edge of said article, means mounting said carriages for movement transversely of said article, a stationary scale, a pointer on one of said carriages in cooperative arrangement with said scale, a light source mounted on each of said carriages on one side of said article, a photovoltaic cell mounted on each carriage on the side of said article opposite said light source, a source of power, said light sources being connected in parallel to said source of power, an adjusting rheostat in series with said light sources, a balancing rheostat connected across said light sources, an ammeter calibrated to indicate variations in the width of the article, said photo-voltaic devices being connected in parallel to said ammeter, and signals responsive to flow of current in said ammeter to indicate over and under width of the said article.

4. A gage for determining the distance between the opposite edges of a moving elongated article comprising a pair of carriages one adjacent each edge of said article, means mounting said carriages for movement transversely of said article, a stationary scale, a pointer on one of said carriages in cooperative arrangement with said scale, a light source mounted on each of said carriages on one side of said article, a pair of cylindrical lenses mounted on each of said carriages between said light source and said article with their convex surfaces adjacent each other, a photo-voltaic cell mounted on each carriage on the side of said article opposite said light source, a source of power, said light sources being connected in parallel to said source of power, an adjusting rheostat in series with said light sources, a balancing rheostat connected across said light sources, an ammeter calibrated to indicate variations in the width of the article, said photo-voltaic devices being connected in parallel to said ammeter, and signals responsive to flow of current in said ammeter to indicate over and under width of the said article.

5. A gage for determining the distance between the opposite edges of a moving elongated article comprising a pair of carriages one adjacent each edge of said article, means mounting said carriages for movement transversely of said article, a stationary scale, a pointer on one of said carriages in cooperative arrangement with said scale, a light source mounted on each of said carriages on one side of said article, a pair of cylindrical lenses mounted on each of said carriages between said light source and said article with their convex surfaces adjacent each other, a photo-voltaic cell mounted on each carriage on the side of said article opposite said light source, a source of power, said light sources being connected in parallel to said source of power, an adjusting rheostat in series with said light sources, a balancing rheostat connected across said light sources, an ammeter having a pair of normally open contacts therein closing at different current values in said ammeter, said photo-voltaic cells being connected in parallel to said ammeter, said last named contacts being connected in parallel to a source of power, a relay coil in series with each of said contacts, each of said relay coils having a normally open contact and a normally closed contact, three width indicating lamps connected in parallel, one of said last named normally open contacts being connected in series with one of said lamps to indicate under width, the other of said last named normally open contacts being connected in series with another of said lamps to indicate over width, the third of said lamps being connected in series with the normally closed contacts to indicate the desired width, and said ammeter being calibrated to indicate variations in the width of the article.

6. A gage for determining the distance between the opposite edges of a moving elongated article comprising a pair of carriages one adjacent each edge of said article, means mounting said carriages for movement transversely of said article, a light source mounted on each of said carriages on one side of said article, a photo-voltaic cell mounted on each carriage on the side of said article opposite said light source, a source of power, said light sources being connected in parallel to said source of power, an adjusting rheostat in series with said light sources, a balancing rheostat connected across said light sources, an ammeter having a pair of normally open contacts therein closing at different current values in said ammeter, said photo-voltaic cells being connected in parallel to said ammeter, said last named contacts being connected in parallel to a source of power, a relay coil in series with each of said contacts, each of said relay coils having a normally open contact and a normally closed contact, three width indicating lamps connected in parallel, one of said last named normally open contacts being connected in series with one of said lamps to indicate under width, the other of said last named normally open contacts being connected in series with another of said lamps to indicate over width, the third of said lamps being connected in series with the normally closed contacts to indicate the desired width, and said ammeter being calibrated to indicate variations in the width of the article.

References Cited in the file of this patent

UNITED STATES PATENTS

| | | |
|---|---|---|
| 1,947,848 | Hatherell et al. | Feb. 20, 1934 |
| 2,237,811 | Cockrell | Apr. 8, 1941 |
| 2,399,305 | Agnew et al. | Apr. 30, 1946 |
| 2,474,906 | Meloon | July 5, 1949 |
| 2,514,985 | Banner | July 11, 1950 |